(12) United States Patent
Ross, Jr. et al.

(10) Patent No.: US 9,958,312 B1
(45) Date of Patent: May 1, 2018

(54) LIQUID LEVEL GAUGE FOR PRESSURIZED TANKS

(71) Applicant: Texas LFP, LLC, Dallas, TX (US)

(72) Inventors: Herbert G. Ross, Jr., Argyle, TX (US); John Gordon Storace, Plano, TX (US)

(73) Assignee: Texas LFP, LLC, Dallas, TX (US)

( * ) Notice: Subject to any disclaimer, the term of this patent is extended or adjusted under 35 U.S.C. 154(b) by 0 days. days.

(21) Appl. No.: 15/490,881

(22) Filed: Apr. 18, 2017

(51) Int. Cl.
*G01F 23/34* (2006.01)
*G01F 23/00* (2006.01)

(52) U.S. Cl.
CPC .......... *G01F 23/34* (2013.01); *G01F 23/0007* (2013.01)

(58) Field of Classification Search
CPC .............................. G01F 23/34; G01F 23/0007
USPC ............................................................ 73/317
See application file for complete search history.

(56) References Cited

U.S. PATENT DOCUMENTS

| | | | |
|---|---|---|---|
| 1,278,469 A | 9/1918 | Horton | |
| 1,451,240 A | 4/1923 | Tulley | |
| 2,500,348 A | 3/1950 | Giers et al. | |
| 2,551,792 A * | 5/1951 | De Giers | G01F 23/32 |
| | | | 73/317 |
| 2,578,104 A | 12/1951 | Taylor | |
| 2,992,560 A | 7/1961 | Morgan et al. | |
| 3,463,843 A * | 8/1969 | Taylor | B29C 65/08 |
| | | | 156/73.5 |
| 3,739,641 A | 6/1973 | Taylor et al. | |
| 4,100,812 A * | 7/1978 | Gray | G01L 7/043 |
| | | | 73/732 |
| 4,402,209 A | 9/1983 | Di Domenico | |
| 4,507,961 A * | 4/1985 | Stradella | G01F 23/62 |
| | | | 116/229 |
| 4,543,730 A | 10/1985 | Scott | |
| 4,553,216 A | 11/1985 | Stevens et al. | |
| 4,669,309 A | 6/1987 | Cornelius | |
| 4,724,706 A * | 2/1988 | Stiever | G01F 23/50 |
| | | | 116/228 |

(Continued)

FOREIGN PATENT DOCUMENTS

| | | |
|---|---|---|
| CA | 1084606 | 8/1980 |
| EP | 1691178 A1 | 8/2006 |

(Continued)

*Primary Examiner* — Hezron E Williams
*Assistant Examiner* — Marrit Eyassu
(74) *Attorney, Agent, or Firm* — Alvin R. Wirthlin

(57) ABSTRACT

A liquid level gauge for determining the level or volume of liquid within a tank includes a mounting head adapted for connection to the tank, a gauge assembly connected to one side of the mounting head, and an elongate sensing probe assembly extending into the tank. The gauge assembly includes a rotatable gauge plate with a scale located thereon and a rotatable indicator that moves across the scale in response to a change in liquid level. The gauge plate is weighted for rotation toward a gravitational force vector for orientation with an upper surface of the liquid in the tank independent of tank tilt. The sensing probe includes a float rod with an integral coil spring hinge to facilitate installation of the gauge within the tank. A counterweight is adjustable along the float rod to fine-tune float weight or buoyancy for a particular gauge configuration and liquid type.

17 Claims, 12 Drawing Sheets

(56) References Cited

U.S. PATENT DOCUMENTS

| | | | |
|---|---|---|---|
| 4,804,944 A * | 2/1989 | Golladay | G01F 23/0023 |
| | | | 250/900 |
| 6,253,609 B1 | 7/2001 | Ross, Jr. et al. | |
| 6,523,406 B2 | 2/2003 | Housey et al. | |
| 6,636,155 B2 * | 10/2003 | Elizondo-Salinas | G08B 5/24 |
| | | | 116/270 |
| 6,675,648 B2 | 1/2004 | Housey et al. | |
| 7,921,873 B2 | 4/2011 | Ross, Jr. et al. | |
| 9,068,877 B2 | 6/2015 | Ross, Jr. | |
| 9,304,027 B2 | 4/2016 | Ross, Jr. | |

FOREIGN PATENT DOCUMENTS

| | | | |
|---|---|---|---|
| GB | 2008757 B | 3/1982 | |
| WO | WO 2007136366 A2 * | 11/2007 | G01F 23/543 |
| WO | WO2007136366 A2 | 11/2007 | |

\* cited by examiner

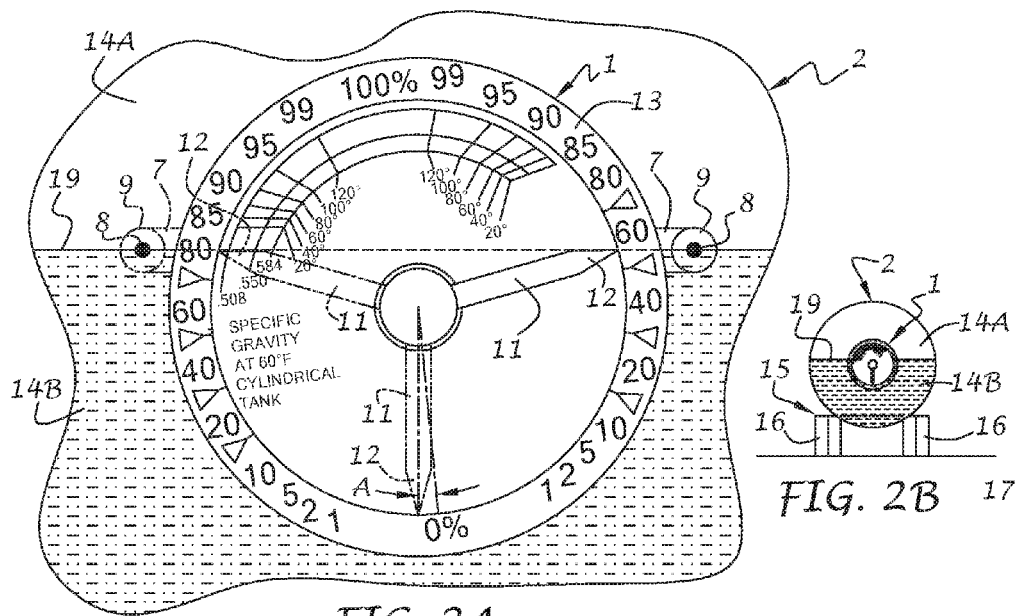
FIG. 2A
(Prior Art)
FIG. 2B
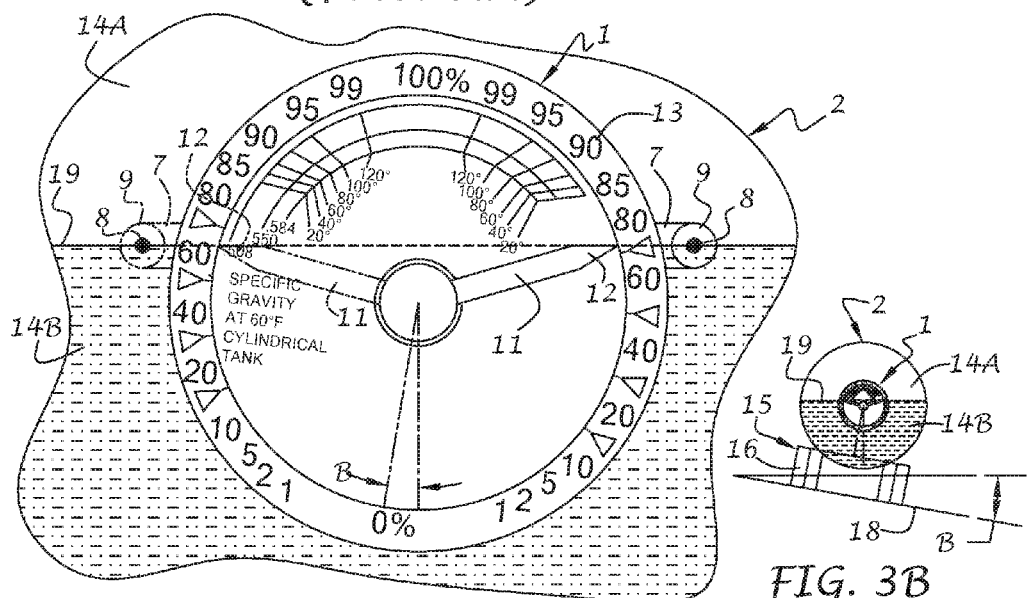
FIG. 3A
(Prior Art)
FIG. 3B

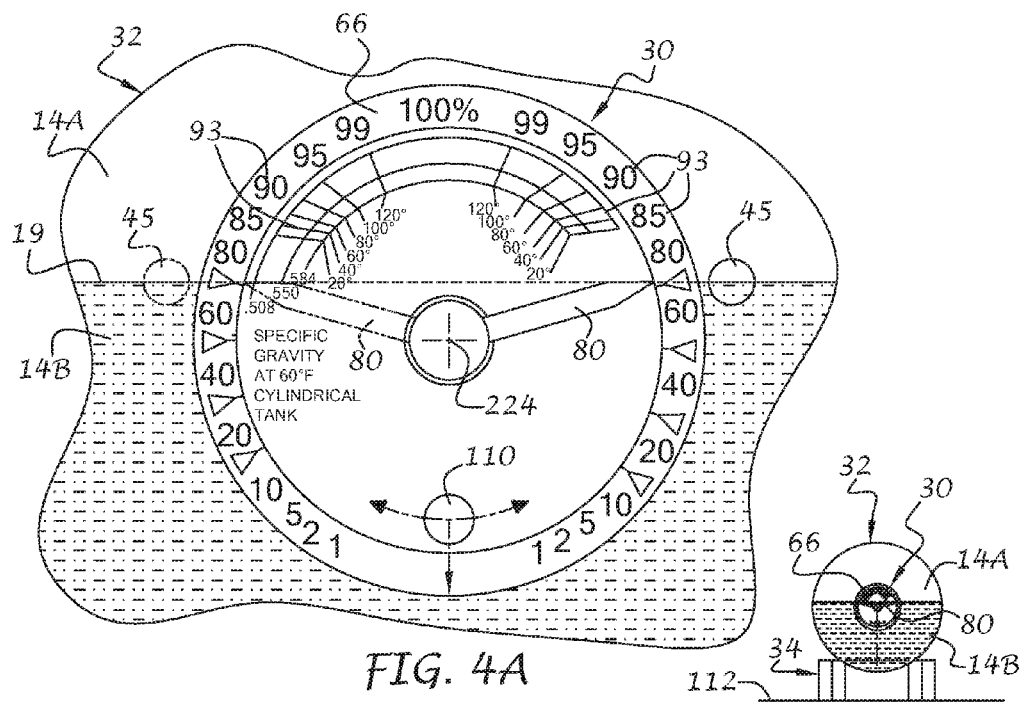
FIG. 4A
FIG. 4B
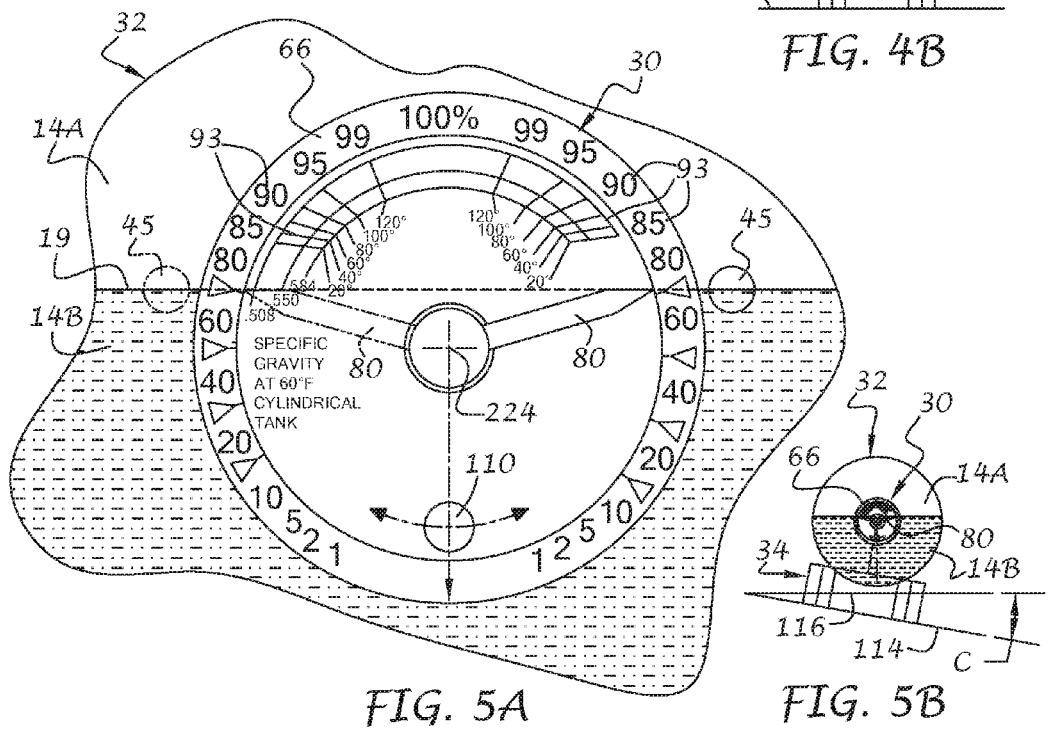
FIG. 5A
FIG. 5B

LIQUID LEVEL GAUGE FOR PRESSURIZED TANKS

BACKGROUND OF THE INVENTION

This invention relates to liquid level gauges, and more particularly to a liquid level gauge having a gauge plate that automatically rotates toward gravity to thereby increase accuracy of liquid level determination in high pressure containers holding liquefied gas, such as liquefied petroleum gas (LPG), propane, or other fuels that exit the tank in a gaseous state, as well as fuel tanks or other containers for holding a liquid that exits the tank in a liquid and/or gaseous state.

It is often necessary to determine the fill level of transportable high pressure storage tanks associated with transport trucks (commonly referred to as bobtails) and large horizontally mounted stationary tanks both during filling and at any time thereafter, such as when the contents of the storage tank have been transferred to one or more smaller tanks. Such high-pressure tanks often contain liquefied petroleum gas (LP-Gas) or propane, butane, natural gas, and so on, in both a liquified and gaseous states. Although some mixing of the gas and liquid may occur during transportation, normally the liquid and gaseous states are separated. Referring to FIG. 1, a common practice for determining the fill level of such storage tanks is to mount a roto-gauge 1 to a storage tank 2, typically at the rear center of the storage tank 2 where it can be manipulated and observed by an operator. As shown, the roto-gauge 1 typically includes a mounting head 3 with external threads 4 that sealably engage inner threads 5 associated with a wall 6 of the storage tank 2. A pipe or tube 7 extends through the mounting head 3 and includes a passageway 8 that extends from an inner tip 9 of the tube 7 located inside the tank to a valve 10 located outside the tank. The valve 10 is of typical construction and can be opened with a wrench or the like for allowing fluid in the liquid and/or gaseous state to flow through the passageway and exit into atmosphere. A handle 11 is connected to the tube 7 for rotating the tube about a central axis with respect to the mounting head 3. As the tube is rotated, the inner tip 9 of the tube will be moved between the gas 14A and liquid 14B (FIG. 2A) in the tank. When the inner tip 9 is in the gas 14A, the operator will be able to hear a hissing sound as gas under high pressure escapes into atmosphere through the passageway 8 As the inner tip 9 of the tube is rotated so as to be immersed in the liquid, the hissing sound will audibly change and the operator should be able to see liquid fuel escape into atmosphere under pressure. When this happens, a pointer 12 formed on the handle 11 can be observed with respect to a gauge plate 13, which typically has numerals and tick marks indicative of the fill level or volume of liquid currently in the tank. The gauge plate 13 is typically sandwiched between the mounting head 3 and a nut 14 secured against the gauge plate.

Although such devices have been used for many years, dispersing pressurized flammable vapor and liquid into the atmosphere for the purpose of ascertaining liquid level in the storage tank can impact the environment and create potential safety issues for inexperienced or distracted operators. Other drawbacks to such a system are shown in FIGS. 2A and 2B for example. During installation of the roto-gauge 1, the gauge plate 13 may be incorrectly mounted at an angle A with respect to the direction of gravity, such that the numerals on the gauge plate do not correctly match up with the actual level of liquid within the holding tank 2. As shown in FIG. 2A, an angle "A" between the 0% reading and the actual needle position (aligned with gravity or the vertical direction) indicating an empty tank illustrates the potential inaccuracy in measurement as all the gauge numbers may be skewed by the angle "A" and fail to match up when the inner tip 9 of the tube 7 is rotated between the liquid/gas interfaces on the right and left sides of the gauge plate 13. As shown in FIG. 2A, the liquid level reading is at approximately 60% when the inner tip 9 is at the liquid/gas interface on the right side of the gauge plate 13, as represented by the handle 11 and pointer 12 in solid line. However, when the handle 11 is rotated to move the tip 9 to the liquid/gas interface on the left side of the gauge plate 13, as viewed in FIG. 2A, the liquid level reading is at approximately 80%, as represented by the handle 11 and pointer 12 in phantom line. Accordingly, a large variance in actual liquid level can occur simply by incorrect installation of the gauge plate 13. Under these circumstances, it may be difficult for an operator to determine with any acceptable degree of accuracy the actual level of liquid within the tank. This is of course problematic when the bobtail or other transport vehicle (schematically represented by numeral 15 in FIG. 2B) with wheels 16 and tank 2 are located on a level surface 17.

This problem is exacerbated when the vehicle 15 is located on the side of a hill or other sloped surface 18 with angle "B" as shown in FIG. 3B. In this instance, even if the gauge plate 13 is properly installed as in FIG. 3A, the liquid level reading between the right and left sides of the tank 2 can still be offset by the angle "B", since the upper surface 19 of the liquid 14B will always be perpendicular to the direction of gravity, i.e. the upper surface 19 will always be horizontal. Accordingly, when the tip 9 of the tube 7 is located at the gas/liquid interface on the right side of the gauge plate 13 in FIG. 3A, the pointer 12 indicates the liquid level is at approximately 70% for example. However, when the handle 11 is rotated to move the tip 9 to the liquid/gas interface on the left side of the gauge plate 13, as viewed in FIG. 3A, the liquid level reading is at approximately 60%, as represented by the handle 11 and pointer 12 in phantom line. Accordingly, a large variance in the manually determined liquid level can occur simply by the vehicle being located on a sloped surface and/or the gauge plate being installed at an incorrect angle or orientation.

In addition to the above, roto-gauges can become damaged through vibration and shock due to the vehicle itself as well as travel over rough roads and highways, thereby causing further inaccuracies in liquid level determination. Errors in liquid level reading can also occur when too much or too little liquid is located within the tank.

It would therefore be advantageous to provide an improved liquid level gauge that overcomes one or more disadvantages of prior art devices.

SUMMARY OF THE INVENTION

In accordance with one aspect of the invention, a liquid level gauge for determining the level or volume of liquid within a tank includes a mounting head adapted for connection to the tank, a gauge assembly connected to one side of the mounting head, and an elongate sensing probe assembly adapted to extend into the tank from the mounting head for detecting the level or volume of liquid within the tank. The gauge assembly includes a gauge plate with a scale located thereon for indicating level or volume of liquid within the tank. The gauge plate is rotatable about a first axis and has a weighted portion such that the gauge plate naturally rotates toward a gravitational force vector to follow a horizontal orientation of an upper surface of the liquid in the tank. An indicator is located adjacent to the scale for indicating level or volume of liquid in the tank. The indicator is rotatable about a second axis and operably connected to the elongate sensing probe. The amount of angular rotation of the indicator is dependent on a change in the level or volume of liquid in the tank. In this manner, the gauge plate and indicator rotate independently of each other to indicate liquid level or volume within the tank independent of tank tilt or orientation, and skewed installation of the gauge assembly.

In accordance with a further aspect of the invention, a gauge assembly includes a gauge plate with a scale located thereon for indicating level or volume of liquid within a tank. The gauge plate is rotatable about a first rotational axis and has a weighted portion such that the gauge plate naturally rotates toward a gravitational force vector to follow a horizontal orientation of an upper surface of the liquid in the tank. An indicator is located adjacent to the scale for indicating level or volume of liquid in the tank. The indicator is rotatable about the first rotational axis, with an amount of angular rotation of the indicator being dependent on a change in the level or volume of liquid in the tank. In this manner, the gauge plate and indicator rotate independently of each other to indicate liquid level or volume within the tank independent of tank tilt or orientation, and skewed installation of the gauge assembly.

In accordance with yet a further aspect of the invention, an elongate sensing probe for use with a liquid level gauge having a tank mounting head for determining a liquid level or volume in a tank includes an outer conduit adapted for connection to the tank mounting head, an inner drive shaft rotatably connected to the outer conduit for rotation about a first rotational axis, a driving magnet located at a proximal end of the inner drive shaft for magnetic coupling with a driven magnet of a gauge assembly, a connecting arm connected to a distal end of the inner drive shaft for rotation therewith about the first rotational axis, a float rod having a longitudinal axis and being connected to the connecting arm and having an integral hinge dividing the float rod into first and second rod sections. The first rod section is located between the integral hinge and a first end of the float rod and the second rod section located between the integral hinge and a second end of the float rod. A float is connected to the first end of the float rod. In this manner, the second rod section is bendable through approximately 90 degrees to facilitate installation of the probe assembly into the tank through a relatively small tank mounting opening.

In accordance with yet a further aspect of the invention, an adjustable counterweight in the form of an elongate tube or the like is slidable along the second rod section and fixed at a calibrated position for precisely adjusting the buoyancy or weight of the float.

Other aspects, objects and advantages of the invention will become apparent upon further study of the following description in conjunction with the attached drawings.

BRIEF DESCRIPTION OF THE DRAWINGS

The following detailed description of the preferred embodiments of the present invention will be best understood when considered in conjunction with the accompanying drawings wherein:

FIG. 2A is an enlarged rear elevational view of the prior art roto-gauge of FIG. 1 showing an improperly installed gauge plate and its effects on pointer position;

FIG. 2B is a schematic rear elevational view of a transportation vehicle on a level surface with the storage tank and associated prior art roto-gauge shown larger than normal;

FIG. 3A is an enlarged rear elevational view of the prior art roto-gauge of FIG. 1 showing a properly installed gauge plate and its effects on pointer position when the transportation vehicle and thus the storage tank are located on a sloped surface;

FIG. 3B is a schematic rear elevational view of a transportation vehicle on a sloped surface with the storage tank and associated prior art roto-gauge shown larger than normal;

FIG. 4A is an enlarged rear elevational view of a liquid level gauge showing a self-orienting gauge plate in accordance with the invention installed on a storage tank;

FIG. 4B is a schematic rear elevational view of a transportation vehicle on a level surface with the storage tank and liquid level gauge in accordance with the invention shown larger than normal;

FIG. 5A is an enlarged rear elevational view of the liquid level gauge showing a self-orienting gauge plate and its effects on pointer position when the transportation vehicle and thus the storage tank are located on a sloped surface;

FIG. 5B is a schematic rear elevational view of the transportation vehicle on a sloped surface with the storage tank and associated liquid level gauge in accordance with the invention shown larger than normal;

It is noted that the drawings are intended to depict only exemplary embodiments of the invention and may not necessarily be to scale. The drawings therefore should not be considered as limiting the scope thereof. The invention will now be described in greater detail with reference to the accompanying drawings, wherein like designations denote like elements throughout the drawing figures.

DETAILED DESCRIPTION OF THE INVENTION

Figure 1:
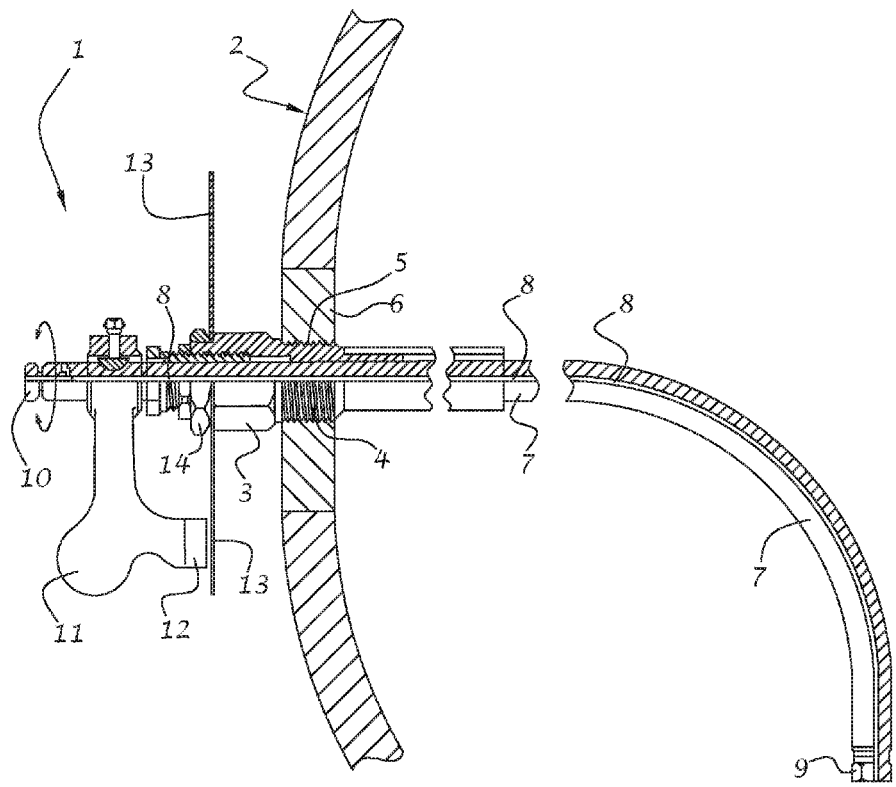
FIG. 1 is a schematic side elevational view (or top plan view) of a prior art liquid level gauge mounted on a storage tank shown in cross-section for manually determining the level of liquid within large stationary and transportable high pressure storage tanks, such as may be used for storing propane, natural gas, or other liquids that have both liquid and gaseous states within the tanks.
Figure 6:
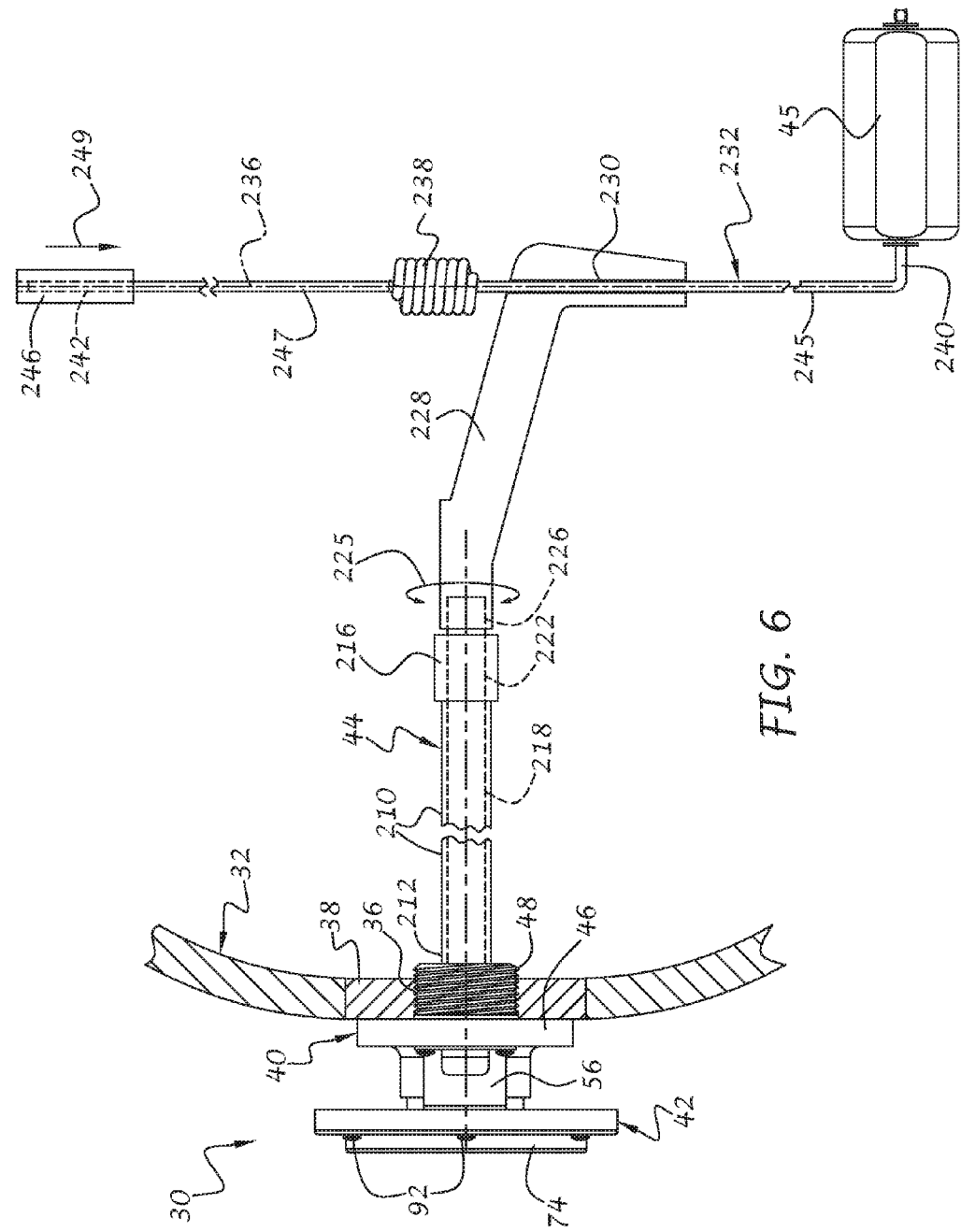
FIG. 6 is a side elevational view (or top plan view) of a liquid level gauge in accordance with the invention mounted on a storage tank shown in cross-section.

Referring now to the drawings, and to FIGS. 4A, 4B and 6 in particular, a liquid level gauge 30 in accordance with an exemplary embodiment of the invention is illustrated. The gauge 30 is shown schematically mounted to a transportable storage tank 32 of a refueling vehicle 34 or the like, but may alternatively be associated with stationary storage tanks. The liquid level gauge 30 is especially suitable for cryogenic tanks or other high pressure containers holding liquefied gas, such as liquefied petroleum gas (LPG), propane, or other fuels that are stored in the tank in a liquid/gaseous state under high pressure, as well as fuel tanks or other containers for holding a liquid that exits the tank in a gaseous and/or liquid state, or any other tank or container associated with a vehicle, machine, or system for holding, transporting, and/or delivering a product in a liquid state or a high pressure gaseous state, and further where it is desirous to determine the level of the liquid state of the product within the tank. Moreover, the present invention can be mounted to rail tankers as well as to other tanks associated with vehicles, equipment, and systems powered by gasoline, kerosene, diesel, etc. It will be understood, therefore, that the invention can be used in a wide variety of vehicles, machines, and systems without departing from the spirit and scope of the invention.

Accordingly, the tank 32 can contain, but is not limited to, liquid propane gas (LPG), methane gas, butane gas, natural gas, GLP, and other liquefied gases or combinations thereof, other cryogenic or non-cryogenic fluids, and so on. The vehicle 34 is intended to carry a large quantity of fuel or other liquid for refilling smaller tanks, such as permanently installed commercial or residential propane tanks, for delivering fuel to a home, vehicle, and other tanks or the like, as is well-known. The tank 32 has an opening 36 (FIG. 6), which is typically formed in the rear wall 38 or side wall (not shown) of the tank. The tank 32 may include one or more manway openings and covers (not shown) at one or more locations along the tank, such as when the tank is divided into several sections or segments, as is well known.

Referring now to FIGS. 6-9, the liquid level gauge 30 preferably includes a mounting base 40 connected to the tank opening 36 (FIG. 6), a gauge head assembly 42 connected to the mounting base 40 outside of the tank 34, and a sensing probe assembly 44 with an attached float 45 connected to the opposite side of the mounting base 40 for extending into the tank 34 to measure the level of liquid within the tank. As shown in FIG. 6, the sensing probe assembly 44 is shown as extending 170 horizontally into the interior of the tank 32 from the side wall 34. However, it will be understood that the sensing probe assembly 44 can extend at any angle into the tank between horizontal and vertical depending on the particular tank configuration and the most convenient position for viewing the gauge plate, without departing from the spirit and scope of the invention.

The mounting base 40 preferably includes a base portion 46 with an integrally formed connecting portion 48 having external threads 50 that engage internal threads 52 formed in the opening 36 of the tank wall 38. For fluid applications, NPT threads are most often specified and, in accordance with an exemplary embodiment of the invention, the connecting portion 48 includes one-inch NPT threads and the opening 36 has corresponding mating threads. It will be understood that the connecting portion 48 and tank opening 36 can have any suitable thread configuration for mounting the base 40 to the tank wall 38. It will be further understood that the threads can be replaced with other connecting means, such as brackets, clamps, welding, mechanical fastening, and so on, without departing from the spirit and scope of the invention. The base portion 46 is shown as generally square-shaped and includes a cavity or depression 54 for receiving a rear portion of the gauge head assembly 42. It will be understood that the base portion 46 can be of any suitable shape and is therefore not limited to the generally square shape.

A pair of brackets 56 and 58 are located between the mounting base 40 and gauge head assembly 42 for securing the mounting base and gauge head assembly together. The brackets 56 and 58 may have angled surfaces so that the gauge head assembly 42 is oriented at an angle that better accommodates observation by a user standing below the gauge head assembly 42 to thereby reduce parallax errors when reading the gauge. The details of the angled brackets can be found in U.S. Pat. No. 9,304,027 issued to Herbert G. Ross, Jr., on Apr. 5, 2016, the disclosure of which is hereby incorporated by reference. Of course, it will be understood that the brackets 56 and 58 may be configured so that the gauge head assembly does not have a downward angle, especially with tank configurations where the gauge head assembly is mounted at or below eye level.

Figure 7:
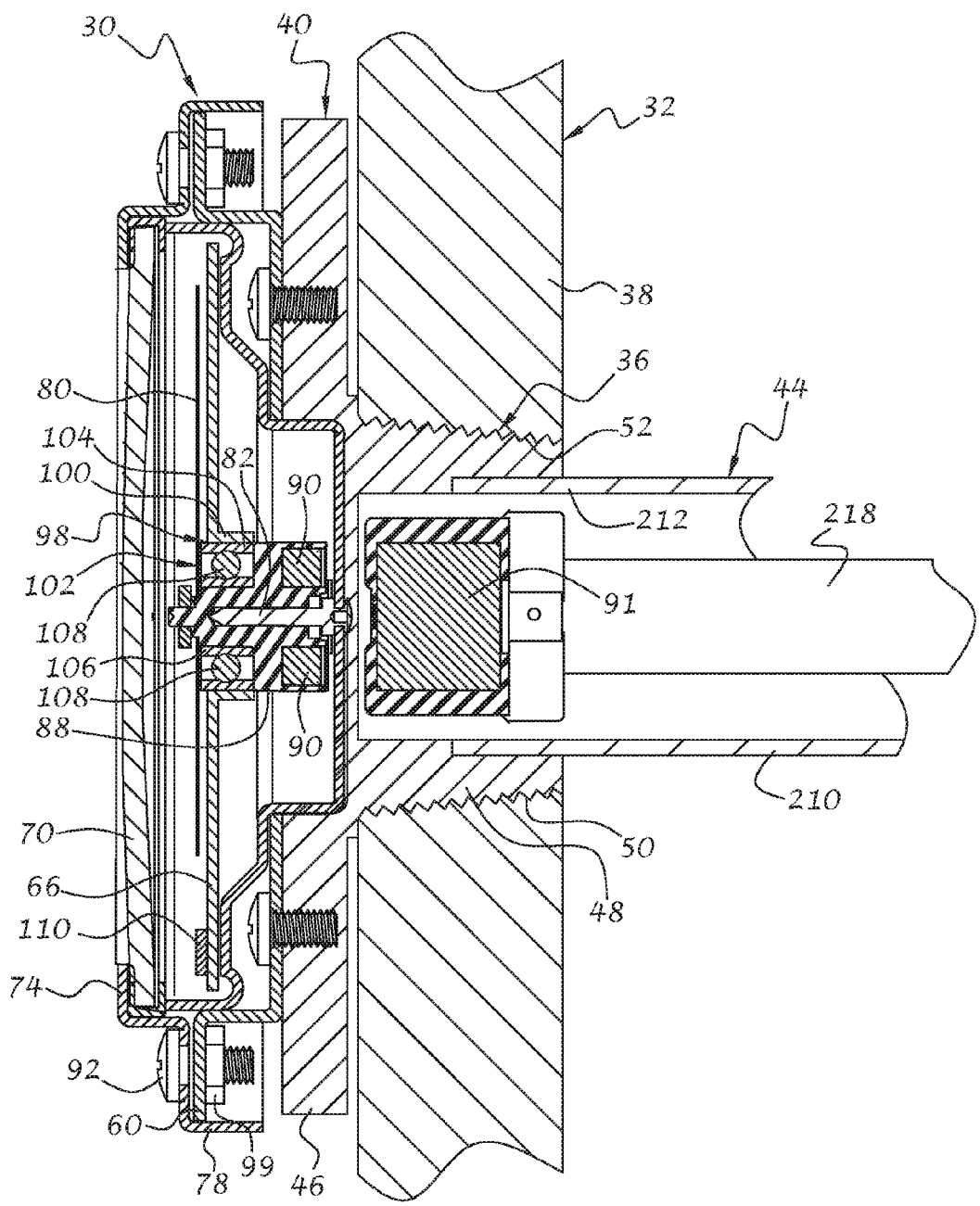
FIG. 7 is an enlarged longitudinal sectional view of the gauge head that forms part of the liquid level gauge of FIG. 6 in accordance with the invention mounted to a storage tank.
Figure 8:
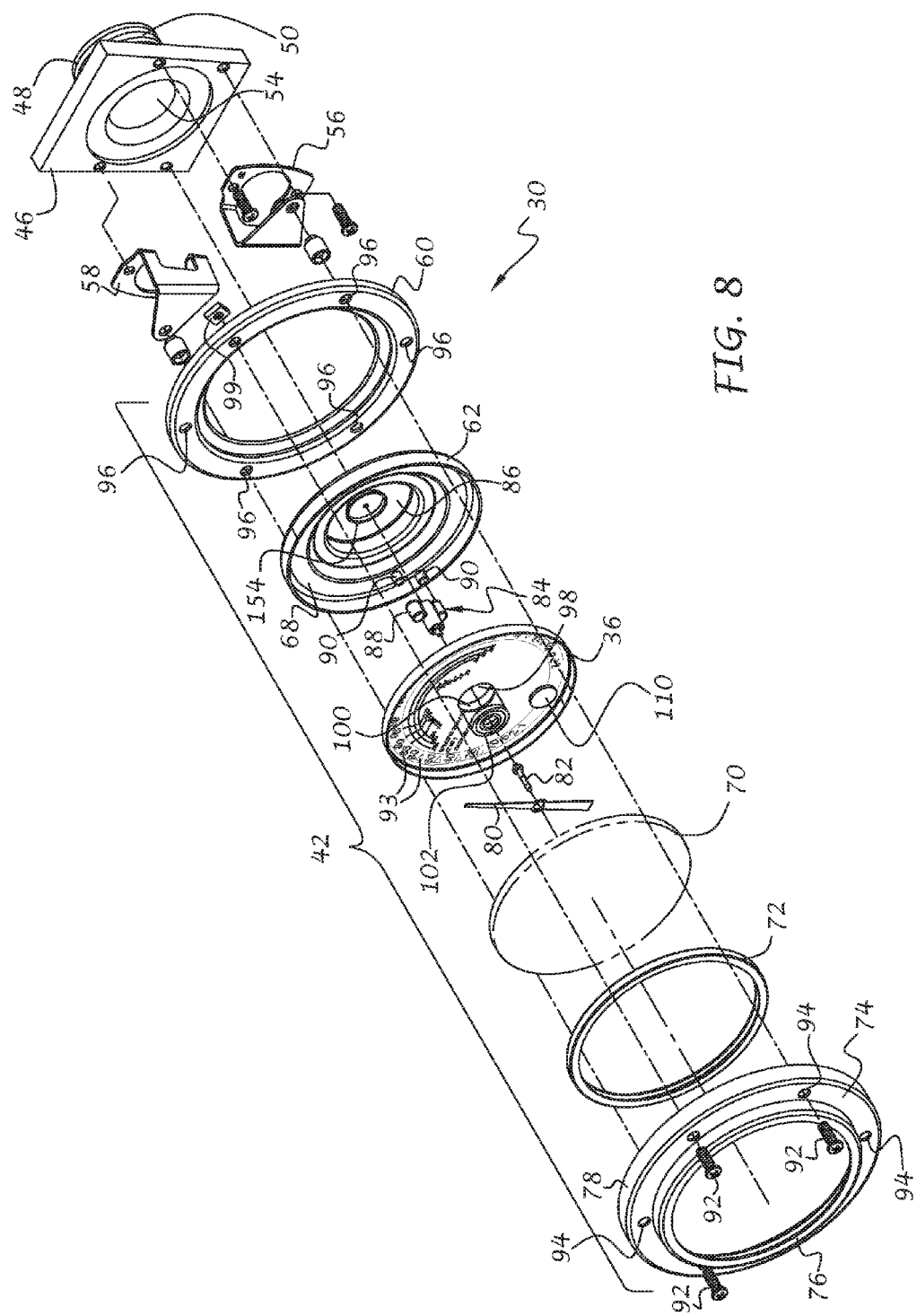
FIG. 8 is an isometric exploded view of a gauge head that forms part of the liquid level gauge of FIG. 6 with the self-orienting gauge plate in accordance with the invention.

With reference to FIGS. 7 and 8, the gauge head assembly 42 preferably includes a rear bezel 60 connected to the brackets 56 and 58, a dial housing 62 supported by a circular flange 64 formed in the rear bezel 60, a self-orienting gauge plate or dial face 66 located within a circular depression 68 of the dial housing 62, a lens 70 positioned over the gauge plate 66, an annular gasket 72 surrounding an outer periphery of the lens 70, and a front bezel 74 with an inner flange 76 that receives the lens 70 and gasket 72, and an outer flange 78 that receives the rear bezel 60 for securing the components of the gauge head assembly together.

A needle bearing 82 extends through a driven magnet assembly 84 and is preferably rigidly connected to the rear wall 86 of the dial housing 62. The driven magnet assembly 84 includes a spindle housing 88 rotatably mounted on the needle bearing 82 and a pair of magnets 90 located within the housing 88 on opposite sides of the needle bearing 82. A pointer 80 is fixedly mounted on the housing 88 for rotation therewith. The magnets 90 are preferably cylindrical in shape and made of a high strength magnetic material, such as Neodymium, so that the driven magnet assembly is responsive to a driving magnet 91 (FIG. 7) of the sensing probe assembly 44. The driving magnet 91 is magnetically coupled to the driven magnets 90 so that rotation of the driving magnet in response to movement of the float 45, causes the driven magnets to rotate a proportional amount, thereby causing the pointer 80 to rotate with respect to the gauge plate 66 for indicating the liquid level state within the tank. Since in some embodiments the driven magnet assembly 84 may be at an angle with respect to the sending unit due to the use of angled brackets 56 and 58 for example, the provision of two axially opposed high strength magnets ensures that hysteresis effects are minimized when compared to prior art driven magnet arrangements. It will be understood that more or less magnets, other magnetic materials, shapes and configurations can be used without departing from the spirit and scope of the invention. Operation of the driving magnet 91 (FIG. 7) and related structure of the sensing probe assembly 44 will be described in greater detail below.

As shown in FIG. 8, the gauge head assembly 42 is preferably connected together by a plurality of threaded fasteners 92 that extend through openings 94 in the front bezel 74 and openings 96 in the rear bezel 60 and thread into corresponding nuts 99 (only one shown in FIG. 8). In this manner, the dial housing 62, gauge plate 66, lens 70, and gasket 72 are securely sandwiched between the rear bezel 60 and front bezel 74. The gauge plate 66 preferably includes a scale 93 with indicia for indicating liquid level in conjunction with the pointer 80 in a well-known manner.

Referring again to FIGS. 7 and 8, the gauge plate 66 is rotatably mounted with respect to the dial housing 62, and independently rotatable with respect to the pointer 80. In this embodiment, the gauge plate 66 is formed with a central opening 98 and integral side wall 100 that surrounds the opening 98. A bearing assembly 102, such as a ball bearing, is located in the central opening 98 and has an outer bearing wall 104 that frictionally engages the side wall 100 for rotational movement therewith and an inner bearing wall 106 that frictionally engages the spindle housing 88 that holds the magnets for rotational movement therewith. Ball bearings 108 located between the inner and outer bearing walls ensure that the inner and outer walls, and thus the frictionally held gauge plate 66 and pointer 80, rotate or pivot independently of each other.

A weight 110 is connected to the gauge plate 66 at a lower end thereof, preferably at the "zero" mark or position where the tank would be in a completely empty condition. The weight 110 can be connected through adhesive bonding, mechanical fastening, friction fit, welding, or any other suitable connection means, so long as the weight is directly below the dead center of the gauge plate when the scale 93 associated with the gauge plate has equivalent markings representative of level and/or volume on both the right-hand and left-hand sides of the gauge plate. It will be understood that the weight can be located at other positions depending on the orientation of the pointer 80 at different liquid level conditions within the tank.

As best shown in FIGS. 4A and 4B, the weight 110 ensures that the gauge plate 66 always rotates toward the gravitational force vector, and thus is oriented in an upright position independent of poor installations where the fixed gauge plate of the prior art may be skewed. As shown in FIG. 4B, the vehicle 34 and accompanying tank 32 with the installed liquid level gauge 30 is located on a relatively level surface 112. In this position, the upper surface 16 of liquid in the tank 32 will be generally parallel with the ground. Even if the gauge head assembly is mounted incorrectly with a noticeable tilt or skew, the internal independently rotatable gauge plate 66 will always be oriented correctly, so that the pointer 80 will consistently indicate actual liquid level, independent of whether the float 45 associated with the sensing probe assembly 44 is located on the right side of the gauge plate 66 (solid line) or on the left side (broken line) as shown in FIG. 4A. By way of example, the pointer 80 will read slightly above 70% full on the right side of the scale 93 (solid line) and the same reading on the left side of the scale (broken line).

In addition, as shown in FIGS. 5A and 5B, when the vehicle 34, and thus the tank 30, are located on a sloped surface 114 having an angle "C" (FIG. 5B) with respect to horizontal 116, the gauge plate 66 will rotate automatically toward gravity to follow the upper surface 16 of the liquid 14B independent of the tilt of the tank and the rotation of the pointer 80, since the weighted gauge plate will always rotate to horizontal thereby correlating with the horizontal orientation of the upper surface 16 of the liquid 14B in the tank 32. Although not shown, damping and/or locking means may be provided for limiting the pivoting speed and/or the range of movement of the gauge plate to minimize or eliminate oscillating movement during transportation, for example.

Figure 9:
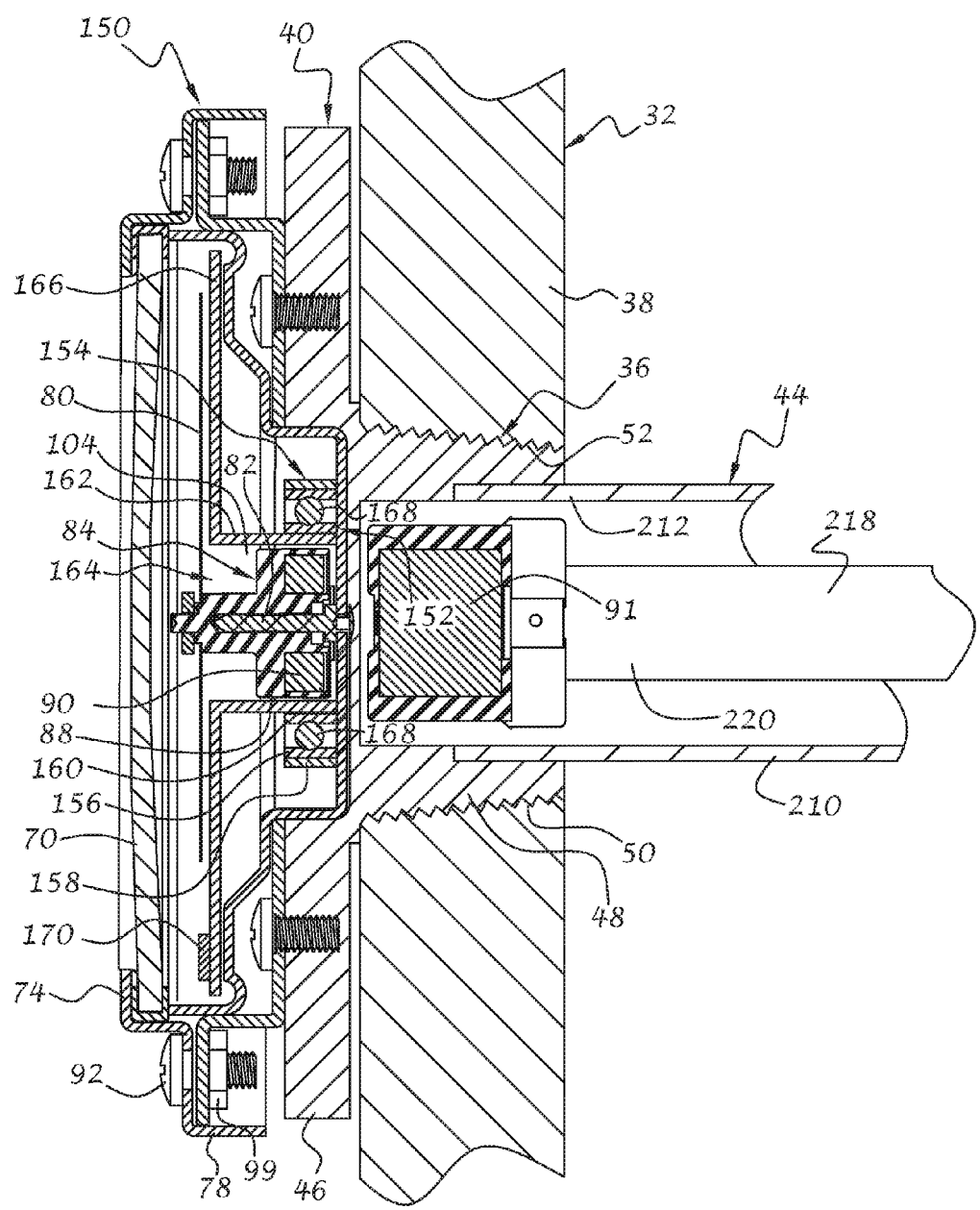
FIG. 9 is an enlarged longitudinal sectional view of a gauge head in accordance with a further embodiment of the invention mounted to a storage tank.

Referring now to FIG. 9, a gauge head assembly 150 in accordance with a further embodiment of the invention is illustrated. The gauge head assembly 150 is similar in construction to the gauge head assembly 42 previously described, with the exception that a bearing 152 is located in a bearing seat 154 (see also FIG. 7) formed in the rear wall 86 of the dial housing 62. The bearing 152 preferably comprises a ball bearing or the like with an outer wall 156 that frictionally engages the side wall 158 of the bearing seat 154 and an inner wall 160 that frictionally engages an elongated central wall 162 of the gauge plate 166. The central wall 162 defines a central opening 164 in the gauge plate 166 for receiving the driven magnet assembly 84 and the needle bearing 82 extending through the driven magnet assembly. Ball bearings 168 located between the inner and outer bearing walls ensure that the inner and outer walls, and thus the frictionally held gauge plate 66 and pointer 80, rotate or pivot independently of each other, tilt of the storage tank 34, skewed mounting of the gauge head assembly 150 on the tank wall 38, and so on.

A weight 170 is connected to the gauge plate 166 at a lower end thereof, preferably at the "zero" mark or position where the tank would be in a completely empty condition. The weight 170 can be connected through adhesive bonding, mechanical fastening, friction fit, welding, or any other suitable connection means, so long as the weight is directly below the dead center of the gauge plate when the scale 93 (FIG. 8) associated with the gauge plate has equivalent markings representative of level and/or volume on both the right-hand and left-hand sides of the gauge plate. It will be understood that the weight can be located at other positions depending on the orientation of the pointer 80 at different liquid level conditions within the tank. Although not shown, damping and/or locking means may be provided for limiting the pivoting speed and/or the range of movement of the gauge plate to minimize or eliminate oscillating movement during transportation, for example.

It will be further understood that the weight 170 can be replaced with a gauge plate having an integrally formed heavier section, such as by forming the gauge plate with a thicker cross section or with a greater amount of material below the center of rotation defined by the central opening 164 and bearing 152, so that the lower half of the gauge plate is naturally heavier than the upper half, to thereby cause rotation of the gauge plate 166 toward the gravitational force vector, as previously described.

Figure 10:
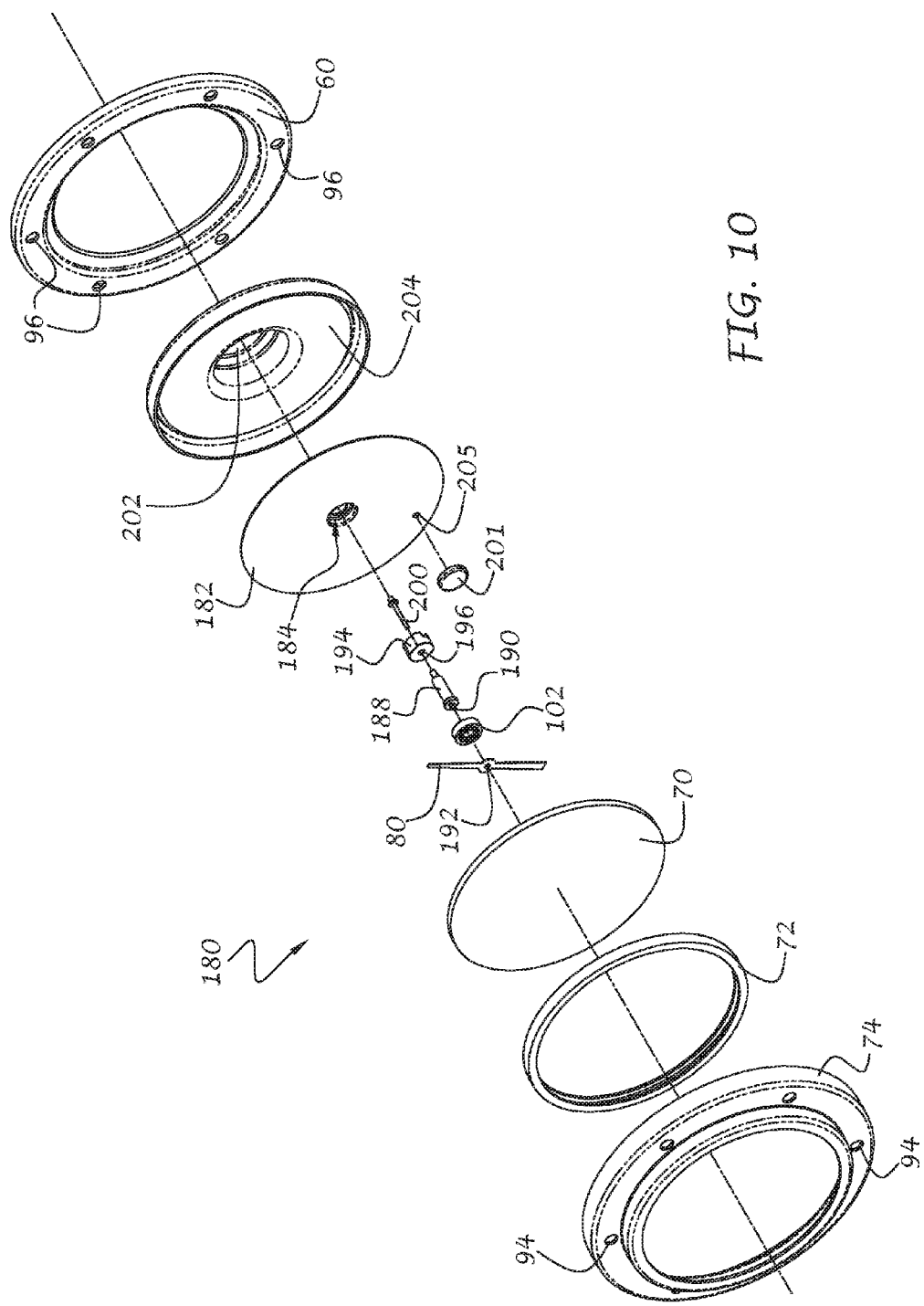
FIG. 10 is an isometric exploded view of a gauge head in accordance with an even further embodiment of the invention.
Figure 11:
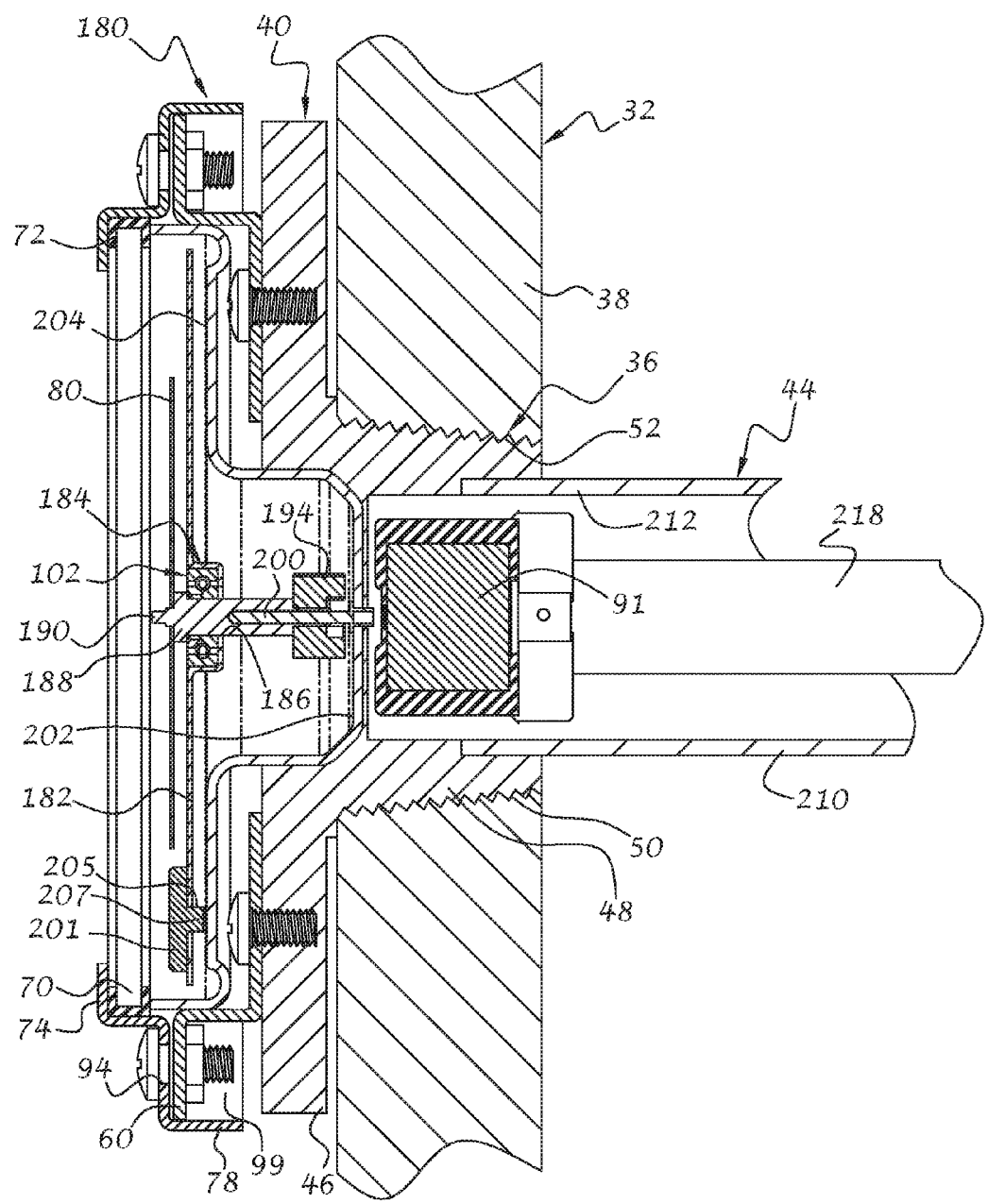
FIG. 11 is an enlarged longitudinal sectional view of the gauge head of FIG. 10.

Referring now to FIGS. 10 and 11, a gauge head assembly 180 in accordance with a further embodiment of the invention is illustrated. The gauge head assembly 180 is similar in construction to the gauge head assembly 42 previously described, with the exception that the gauge plate 182 has a cup-shaped depression or bearing seat 184 for receiving the bearing 102. The gauge plate 182 is shown without a scale for simplicity, it being understood that the scale 93 (FIG. 4A) can be associated with the gauge plate 182, or any suitable indicia for any desired information associated with liquid level or volume. A central opening 186 (FIG. 11) is formed in the bearing seat 184 for receiving a spindle 188. The spindle 188 includes a forward end with a pin 190 and the pointer 80 has a central opening 192 that receives the pin 190 so that the pointer rotates with the spindle 188. The spindle 188 is pressed into the bearing 102 and the bearing is in turn pressed into the bearing seat 184 so that the gauge plate 182 and pointer 80 rotate independently of each other, as previously described. A magnet 194 has a central bore 196 that receives a rear projection 198 of the spindle 188. A pin 200 extends through the rear wall 202 of the dial housing 204 and is secured thereto. The pin also extends through the central bore 196 of the magnet 194 and the rear projection 198 of the spindle 188 to secure the assembly to the dial housing 204. As in the previous embodiments, the bearing 102 ensures that the gauge plate 182 with attached weight 201 always rotates toward the gravitational force vector independent of tilt of the tank, skewed installation of the gauge head assembly, and so on. An aperture 205 is formed in the gauge plate 182 for mounting the weight 201 which, as shown in FIG. 11, has an integrally formed boss 207 that extends through the aperture. The boss can then be staked or deformed to positively secure the weight 201 to the gauge plate 182.

Figure 12:
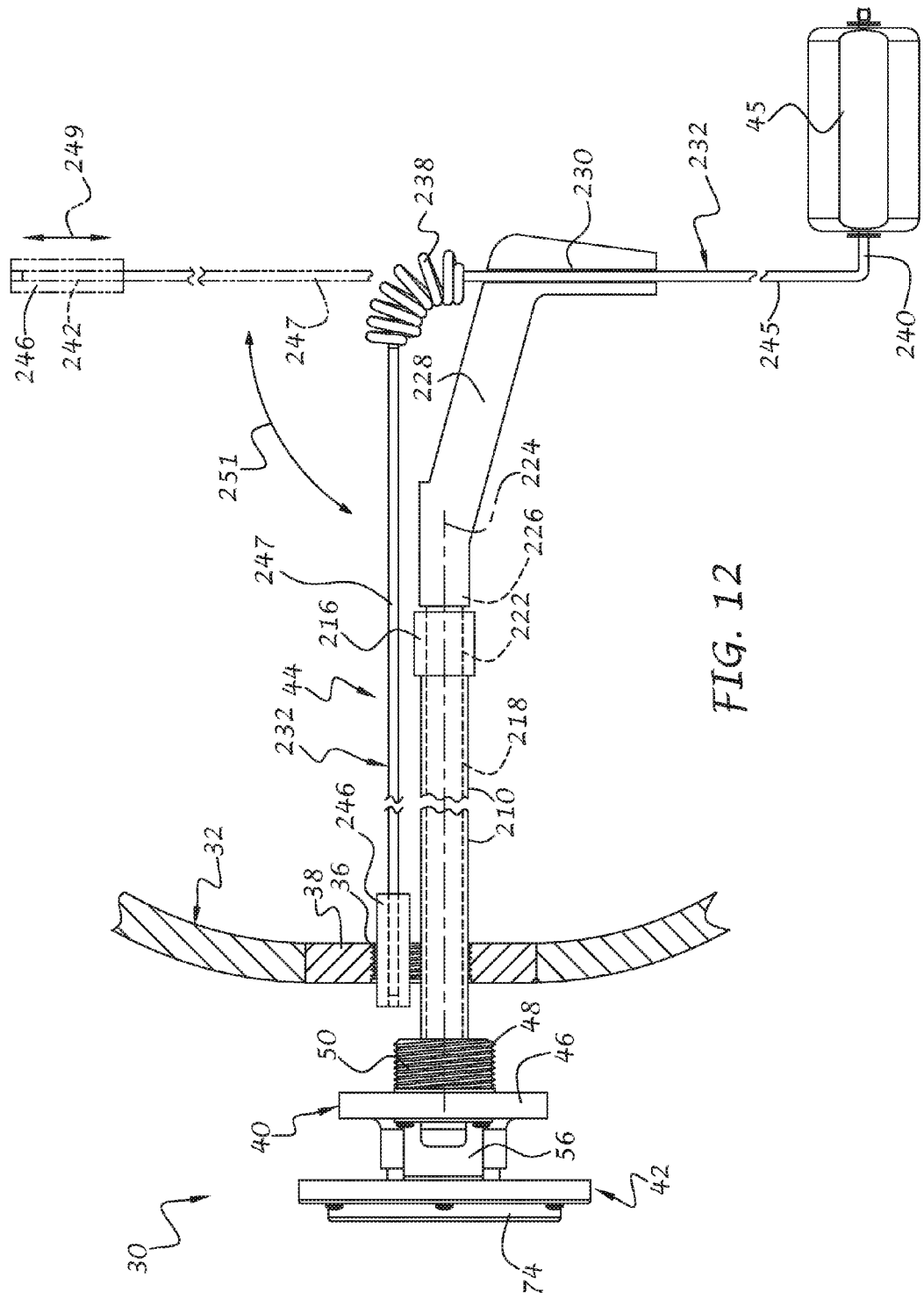
FIG. 12 is a view similar to FIG. 6 showing installation of the liquid level gauge through a relatively small tank opening.

Referring now to FIGS. 6 and 12, the sensing probe assembly 44 will now be described. Although the sensing probe assembly is intended to be used with any of the above-described gauge head assembly embodiments having a weighted self-orienting gauge plate, it will be understood that the sensing probe assembly 44 can be used with other gauge heads having stationary gauge plates, as well as with digital displays or the like without departing from the spirit and scope of the invention.

As best shown in FIGS. 6, 7, 9, and 12, the sensing probe assembly 44 preferably includes an outer tube or conduit 210 having a proximal end 212 press-fit into the connecting portion 48 of the mounting base 40 (FIGS. 7 and 9) or otherwise connected thereto so that the outer conduit 210 is stationary with respect to the mounting base 40. A distal end 214 of the conduit 210 includes a bearing 216 (FIG. 6) that receives an inner drive shaft 218 (shown in hidden line in FIG. 6). The inner drive shaft 218 extends approximately the length of the outer conduit 210 and has a proximal end 220 located adjacent to the proximal end 212 with the driving magnet 91 connected thereto and a distal end 222 that is received in the bearing 216 so that the drive shaft 218 and driving magnet 91 rotate about a central rotational axis 224 (FIG. 6) of the drive shaft, as shown by rotational arrows 225. The central rotational axis 224 is preferably coincident with a central axis of the outer conduit 210. The distal end 222 of the drive shaft 218 is also received in an opening 226 of a float rod connecting arm 228. The drive shaft 218 is preferably square or rectangular in cross section and the opening 26 of the connecting arm 228 is complementary in shape so that the connecting arm 228 is automatically indexed with the drive shaft 218 and the driving magnet 91. In this manner, the driving magnet 91 is properly magnetically coupled with the driven magnet(s) 90 (FIG. 7), or 194 (FIG. 11) of the associated gauge head assembly to thereby rotate the pointer 80 upon a change in liquid level in the tank. It will be understood that the drive shaft, the complementary opening in the connecting arm, the outer conduit and other structure can be formed of any desired cross sectional shape without departing from the spirit and scope of the invention.

The connecting arm 228 has an elongate slot or bore 230 that extends transverse to, and preferably perpendicular with, the central axis 224. A float rod 232 is secured in the elongate slot 230 and has a central rod axis 236 that extends transverse to, and preferably perpendicular to, the central axis 224. The float rod 232 includes an integral hinge 238 formed as a coil spring with a coil axis collinear with the float rod axis 236. The coil spring 238 is formed between a first rod end 240 a second rod end 242 to create respective first and second float rod sections 245 and 247. The first rod end 240 is bent at approximately 90 degrees and receives a float 45 in a conventional manner so that the connecting arm 228, and thus the drive shaft 218 and driving magnet 91 rotate in proportion to float movement due to a change in liquid level.

Depending on the particular float length and float arm length selected, as well as the particular fluid to be measured, different float materials, and so on, different gravitational forces will be present on the float, thus causing the float to sink into the liquid being measured or to rise above the liquid level. Accordingly, the ability to adjust the buoyancy of the float 45 so that it rests at the proper position with respect to the surface of the liquid being measured is important for accurate operation of the liquid level gauge. Accordingly, an adjustable counterweight 246 is connectable to the second end 242 of the float rod and is slidable along the length of the second float rod section 247 between the integral hinge 238 and the second end 242. The counterweight 246 is preferably in the form of an elongate tube that can be slid onto the second end 242 of the float rod 232 and adjusted along the length of the second float rod section 247, as represented by arrow 249 in FIG. 12, until the proper buoyancy of the float 45 for a particular liquid to be measured, a particular float rod length, a particular float material and other factors, has been obtained. The counterweight 246 can then be fixed into position through frictional interference between the counterweight 246 and the float rod, by mechanical fastening, pinching or striking, adhesive bonding, or any known fastening means. When the counterweight 246 is constructed of a heat-shrink material, it can be fixed in the calibrated position simply by applying heat to the counterweight until it frictionally grasps the float rod. A method for calibrating the buoyancy of the float is further described in U.S. Pat. No. 9,068,877 issued to Herbert G. Ross, Jr., on Jun. 30, 2015, the disclosure of which is hereby incorporated by reference.

Referring now to FIGS. 6 and 12, one of the difficulties with prior art liquid level probes is associated with installing rather long probe components, such as the float rod and attached float and counterbalance, inside the tank via a relatively small mounting head opening formed in the tank. Accordingly, the sensing probe assembly 44 of the present invention addresses this difficulty by providing the integral hinge 238 between the counterweight 246 and the longitudinal rotational centerline 224 of the drive shaft 218. As shown in FIG. 12, the integral hinge 238, formed as a coil spring, is bent approximately 90 degrees, as represented by arrows 251 in FIG. 12, for this particular configuration of the sensing probe assembly 44, so that the float 45 and first float rod section 245 on one side of the integral spring can be inserted into the tank opening 36 at an angle during installation, while the second float rod section 247 on the other side of the integral spring 238 and the precalibrated counterweight 246 are held against the outer conduit 210 or other portion of the sensing probe assembly 44. With this arrangement, the conduit 210 and float rod 232 with the counterweight 246 are slightly shifted radially in the opening 36 of the tank wall 38 (FIG. 12) until the float rod and counterbalance clear the opening. Once free of the opening inside the tank 32, the integrally formed spring 238 will cause the second float rod section 247 of the float rod 232 to return to its normal operating position in alignment with the first float rod section 245, as shown in FIG. 6 (and in dashed line in FIG. 12). The connecting portion 48 of the mounting head 46 can then be screwed into the tank opening 36 or otherwise attached to the tank wall (depending on the particular mounting configuration) to thereby install the liquid level gauge on the tank.

Figure 13:
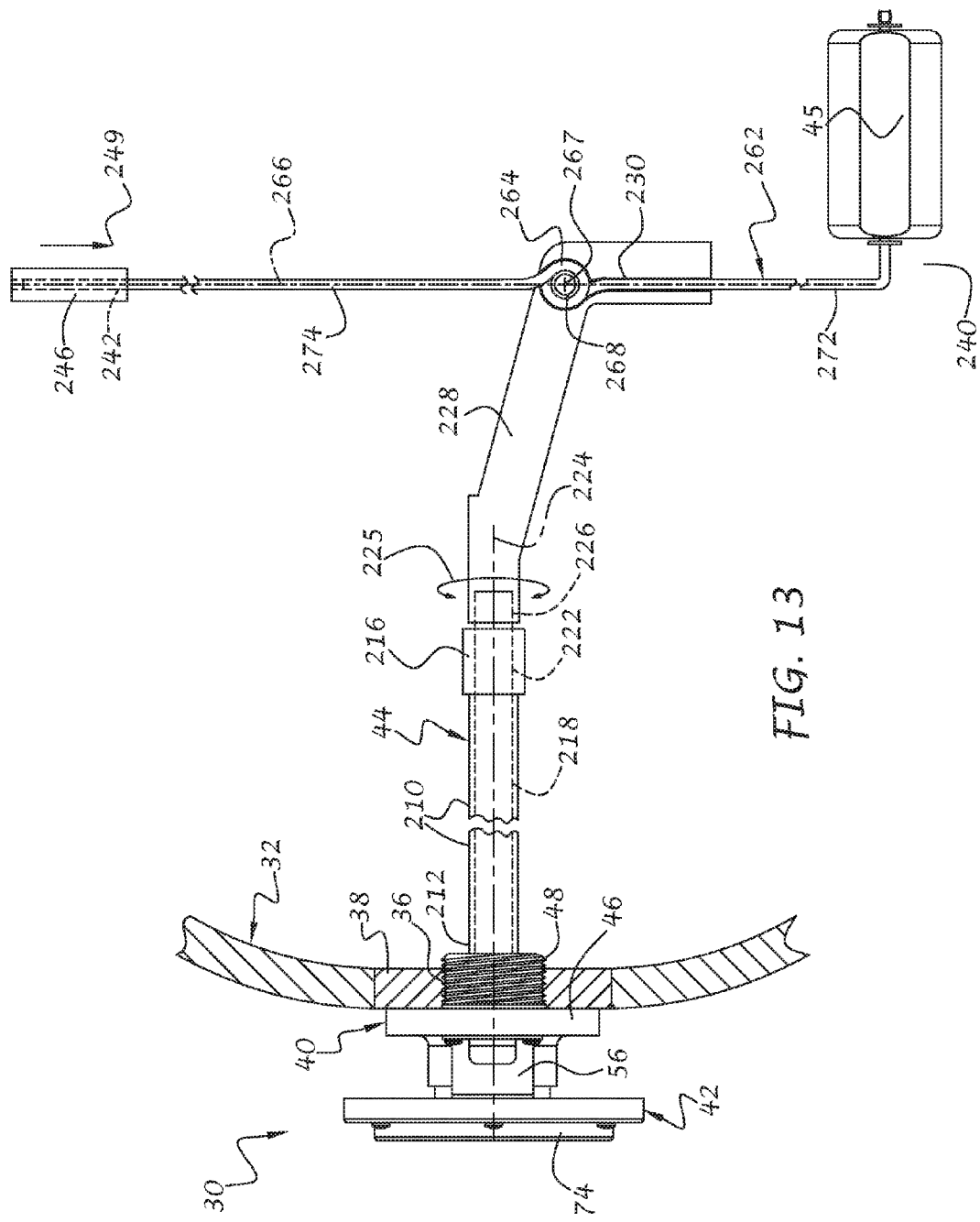
FIG. 13 is a side elevational view of a liquid level gauge in accordance with a further embodiment of the invention mounted on a storage tank shown in cross-section.
Figure 14:
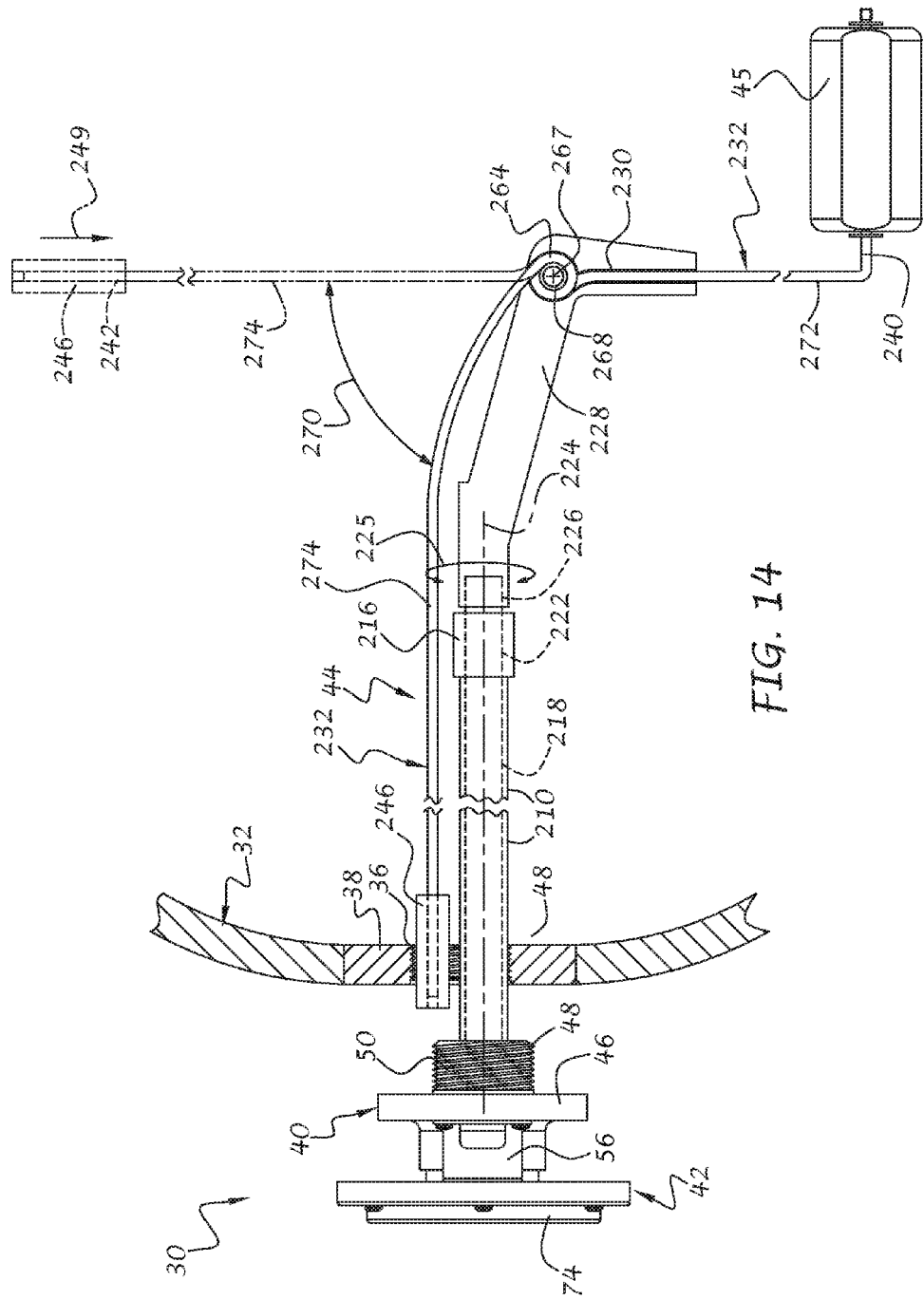
FIG. 14 is a view similar to FIG. 13 showing installation of the liquid level gauge further embodiment through a relatively small tank opening.

Referring now to FIGS. 13 and 14, a sensing probe assembly 260 in accordance with a further embodiment of the invention is illustrated. The sensing probe assembly 260 is similar in construction to the sensing probe assembly 44 previously described, with the exception that the float rod 262 is formed with an integral hinge 264 in the form of a coil spring with a central axis 267 perpendicular to both the longitudinal axis 266 of the float rod 262 and the central rotational axis 224 of the drive shaft 218 (perpendicular to the page as shown in FIG. 13). A projection 268 extends outwardly from the arm 228 for receiving and retaining the coil spring 264.

In order to install the sensing probe assembly 260 in the tank, and as shown in FIG. 14, the integral hinge 264 is bent approximately 90 degrees, as represented by arrows 270 in FIG. 14, for this particular configuration of the sensing probe assembly 260, so that the float 45 and a first float rod section 272 on one side of the integral spring can be inserted into the tank opening 36 at an angle during installation, while a second float rod section 274 on the other side of the integral spring 264 and the precalibrated counterweight 246 are held against the outer conduit 210 or other portion of the sensing probe assembly 44. With this arrangement, the conduit 210 and float rod 232 with the counterweight 246 are slightly shifted radially in the opening 36 of the tank wall 38 (FIG. 12) until the float rod and counterbalance clear the opening. Once free of the opening inside the tank 32, the integrally formed coil spring 264 will cause the second float rod section 274 of the float rod 262 to return to its normal operating position in alignment with the first float rod section 272, as shown in FIG. 13 (and in dashed line in FIG. 14). The connecting portion 48 of the mounting head 46 can then be screwed into the tank opening 36 or otherwise attached to the tank wall (depending on the particular mounting configuration) to thereby install the liquid level gauge on the tank.

It will be understood that the term "preferably" as used throughout the specification refers to one or more exemplary embodiments of the invention and therefore is not to be interpreted in any limiting sense.

It will be further understood that the term "connect" and its derivatives refers to two or more parts capable of being attached together either directly or indirectly through one or more intermediate members. In addition, terms of orientation and/or position as may be used throughout the specification, such as "lower" and "upper", denote relative, rather than absolute orientations and/or positions.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A liquid level gauge for determining the level or volume of liquid within a tank, the liquid level gauge comprising:
    a mounting head adapted for connection to the tank;
    a gauge assembly connected to one side of the mounting head; and
    an elongate sensing probe assembly adapted to extend into the tank from the mounting head for detecting the level or volume of liquid within the tank;
    wherein the gauge assembly comprises:
        a gauge plate with a scale located thereon for indicating level or volume of liquid within the tank;
        the gauge plate being rotatable about a first axis and having a weighted portion such that the gauge plate naturally rotates toward a gravitational force vector to follow a horizontal orientation of an upper surface of the liquid in the tank;
        an indicator located adjacent to the scale for indicating level or volume of liquid in the tank, the indicator being rotatable about a second axis and operably connected to the elongate sensing probe, with an amount of angular rotation of the indicator being dependent on a change in the level or volume of liquid in the tank;
    wherein the gauge plate and indicator rotate independently of each other to indicate liquid level or volume within the tank independent of tank tilt or orientation, and skewed installation of the gauge assembly.

2. A liquid level gauge according to claim 1, wherein the first and second axes are collinear.

3. A liquid level gauge according to claim 2, wherein the gauge assembly further comprises:
    a spindle extending through a central opening in the gauge plate for rotation about the second axis, with the indicator connected to the spindle; and
    a bearing assembly having an outer wall connected to the gauge plate, an inner wall connected to the spindle, and at least one intermediate bearing member located between the inner and outer walls so that the inner and outer walls rotate independently about the first and second collinear axes, to thereby cause the gauge plate and indicator to rotate independently about the axes.

4. A liquid level gauge according to claim 3, wherein the bearing assembly is located within a cup-shaped depression formed in the gauge plate.

5. A liquid level gauge according to claim 4, and further comprising:
    a driven magnet connected to the spindle for rotation therewith; and
    the elongate sensing probe comprises a driving magnet that rotates in response to a change in liquid level or volume in the tank, the driving magnet being magnetically coupled to the driven magnet to thereby rotate the spindle and thus the indicator with respect to the scale to thereby indicate liquid level or volume within the tank.

6. A liquid level gauge according to claim 4, wherein the gauge assembly further comprises:
    a rear bezel connected to the mounting head;
    the dial housing being supported by the rear bezel;
    a transparent lens positioned over the dial housing for viewing the scale and the indicator;
    a gasket positioned over the transparent lens; and
    a front bezel connected to the rear bezel with the dial housing, gauge plate, indicator, lens, gasket, and bearing assembly located therebetween.

7. A liquid level gauge according to claim 5, wherein the elongate sensing probe further comprises:
    an outer conduit connected to the mounting head;
    an inner drive shaft rotatably connected to the outer conduit for rotation about a third axis, with the driving magnet located at a proximal end of the inner drive shaft;
    a connecting arm connected to a distal end of the inner drive shaft for rotation therewith about the third axis;

a float rod having a longitudinal axis and being connected to the connecting arm and having an integral hinge dividing the float rod between a first rod section between the integral hinge and a first end of the float rod and a second rod section between the integral hinge and a second end of the float rod;

a float connected to the first end of the float rod; and wherein the second rod section is bendable through approximately 90 degrees to facilitate installation of the probe assembly into the tank through a relatively small tank mounting opening.

8. A liquid level gauge according to claim 7, wherein the integral hinge comprises a coil spring with a central axis at least parallel with the longitudinal axis of the float rod.

9. A liquid level gauge according to claim 7, wherein the integral hinge comprises a coil spring with a central axis oriented generally perpendicular with the longitudinal axis of the float rod.

10. A liquid level gauge according to claim 7, and further comprising a counterweight connected to the second rod section to create correct buoyancy of the float with respect to the liquid being measured.

11. A liquid level gauge according to claim 10, wherein the counterweight is adjustable along a length of the second rod segment and fixed at a calibrated position wherein the float exhibits a predetermined buoyancy or weight.

12. A liquid level gauge according to claim 11, wherein the counterweight comprises an elongate tube that slides over the second rod segment during calibration.

13. A liquid level gauge according to claim 1, wherein the weighted portion of the gauge plate comprises a weight connected to the gauge plate at a position below the first axis.

14. A gauge assembly comprising:

a gauge plate with a scale located thereon for indicating level or volume of liquid within a tank;

the gauge plate being rotatable about a first rotational axis and having a weighted portion such that the gauge plate naturally rotates toward a gravitational force vector to follow a horizontal orientation of an upper surface of the liquid in the tank;

an indicator located adjacent to the scale for indicating level or volume of liquid in the tank, the indicator being rotatable about the first rotational axis, with an amount of angular rotation of the indicator being dependent on a change in the level or volume of liquid in the tank;

wherein the gauge plate and indicator rotate independently of each other to indicate liquid level or volume within the tank independent of tank tilt or orientation, and skewed installation of the gauge assembly.

15. A gauge assembly according to claim 14, and further comprising:

a spindle extending through a central opening in the gauge plate for rotation about the first rotational axis, with the indicator connected to the spindle; and a bearing assembly having an outer wall connected to the gauge plate, an inner wall connected to the spindle, and at least one intermediate bearing member located between the inner and outer walls so that the inner and outer walls rotate independently about the first rotational axis, to thereby cause the gauge plate and indicator to rotate independently about the axis.

16. A gauge assembly according to claim 15, wherein the bearing assembly is located within a cup-shaped depression formed in the gauge plate.

17. A gauge assembly according to claim 16, and further comprising:

a driven magnet connected to the spindle for rotation therewith, the driven magnet being magnetically couplable to a driving magnet of a sensing probe that rotates in response to a change in liquid level or volume in the tank to thereby cause a corresponding rotation of the indicator with respect to the scale to thereby indicate liquid level or volume within the tank.

* * * * *